(No Model.) 3 Sheets—Sheet 1.

T. & L. B. HANCOCK.
CIGAR BUNCHING MACHINE.

No. 463,508. Patented Nov. 17, 1891.

WITNESSES:
Fred G. Dieterich
W. D. Blondel

INVENTORS
Thomas Hancock
Lee B. Hancock
BY
ATTORNEYS

THE NORRIS PETERS CO., PHOTO-LITHO., WASHINGTON, D. C.

(No Model.) 3 Sheets—Sheet 2.

T. & L. B. HANCOCK.
CIGAR BUNCHING MACHINE.

No. 463,508. Patented Nov. 17, 1891.

WITNESSES:
Fred G. Dieterich
M. D. Blondel

INVENTORS
Thomas Hancock
Lee B. Hancock
BY Munn & Co.
ATTORNEYS (No Model.) T. & L. B. HANCOCK.
CIGAR BUNCHING MACHINE.
No. 463,508. Patented Nov. 17, 1891.
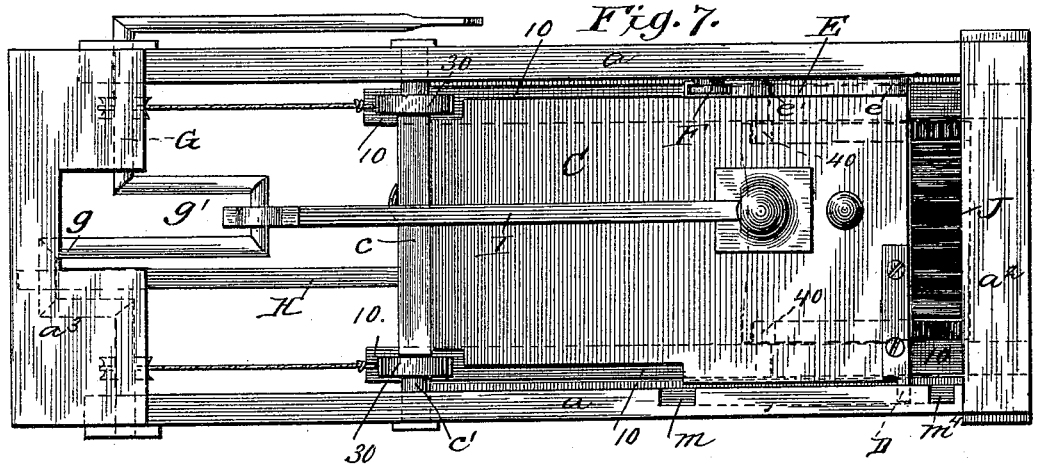
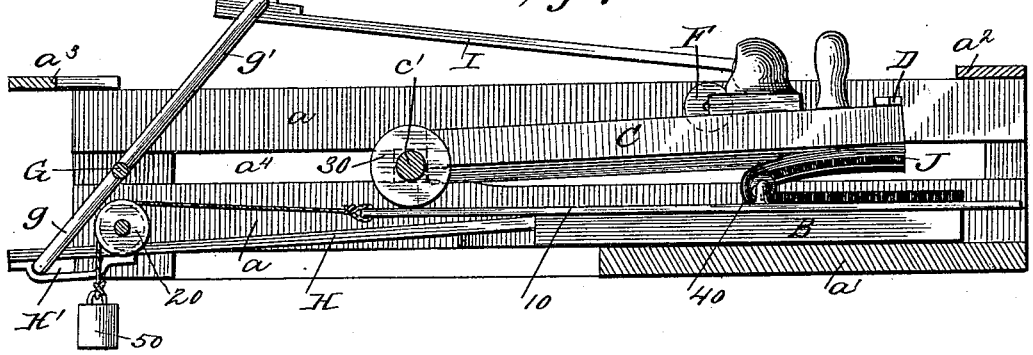
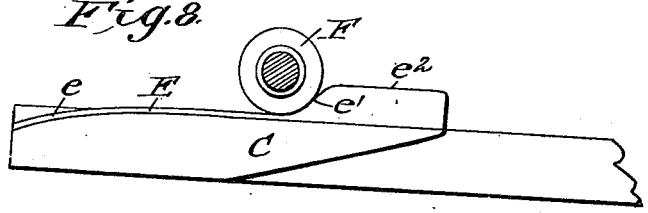
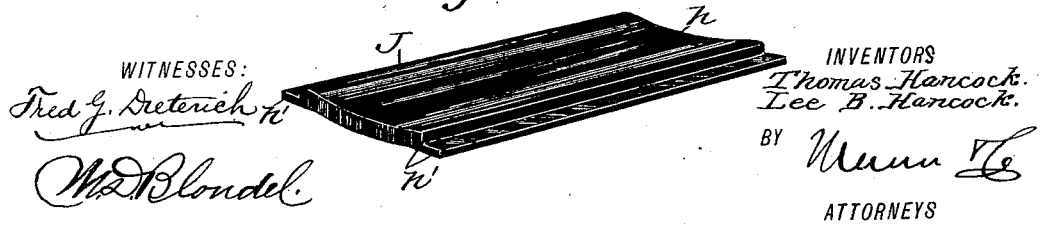
WITNESSES:
Fred G. Dieterich
M. D. Blondel
INVENTORS
Thomas Hancock
Lee B. Hancock
BY Munn & Co.
ATTORNEYS

UNITED STATES PATENT OFFICE.

THOMAS HANCOCK AND LEE B. HANCOCK, OF RICHMOND, VIRGINIA.

CIGAR-BUNCHING MACHINE.

SPECIFICATION forming part of Letters Patent No. 463,508, dated November 17, 1891.

Application filed November 10, 1890. Serial No. 370,983. (No model.)

*To all whom it may concern:*

Be it known that we, THOMAS HANCOCK and LEE B. HANCOCK, residing at Richmond, in the county of Henrico and State of Virginia, have invented certain new and useful Improvements in Cigar-Bunching Machines, of which the following is a specification.

Our invention has for its object to provide a simple and effective bunching-machine which will serve to quickly and evenly wrap the binder around the tobacco-fillings when placed therein.

It has also for its object to provide means whereby the binder-leaf will be wound about the fillings in such a manner as to present an even finish—i. e., the binder is wrapped as smoothly about the fillings at the point as at the butt-end of the bunch.

It furthermore has for its object to arrange the rolling-apron in such a manner in connection with suitable traveler-slides to act in the nature of formers, whereby after the binder has been placed upon the tobacco-fillings the cigar-body will have its proper shape ready for the outside wrapper. Finally, our invention has for its object to produce a machine which can be constructed at a small cost and easily operated.

To this end our invention consists in the peculiar combination and novel arrangement of parts, all of which will hereinafter be fully described in the annexed specification, and particularly pointed out in the claims, reference being had to the accompanying drawings, in which—

Figure 1:
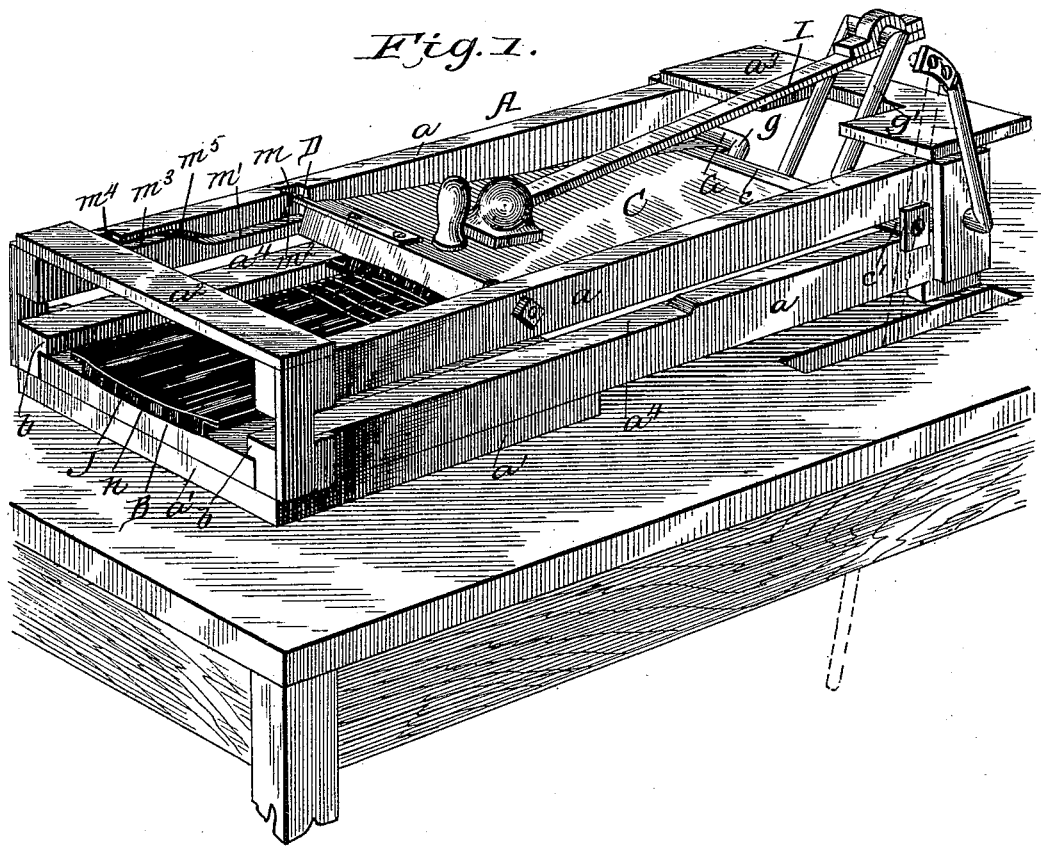
Figure 6:
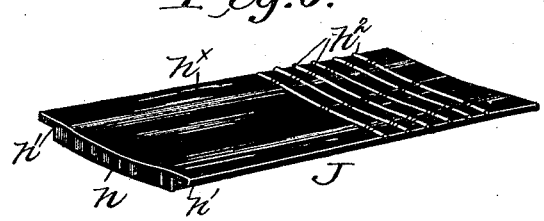
Figure 2:
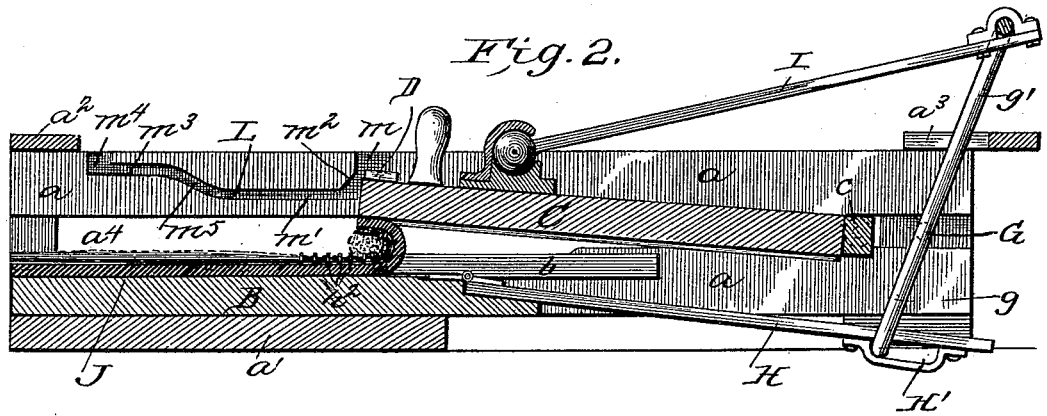
Figure 3:
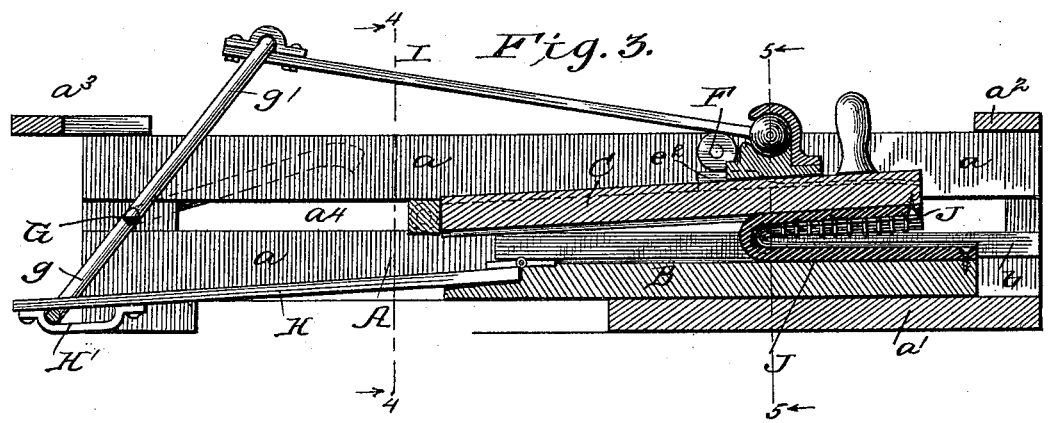
Figure 4:
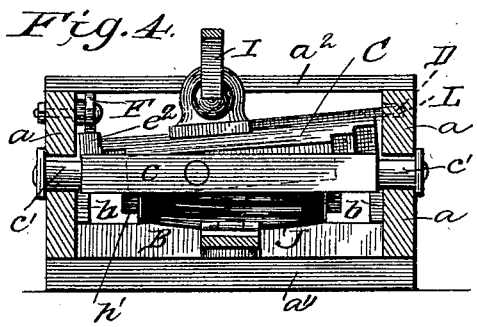
Figure 5:
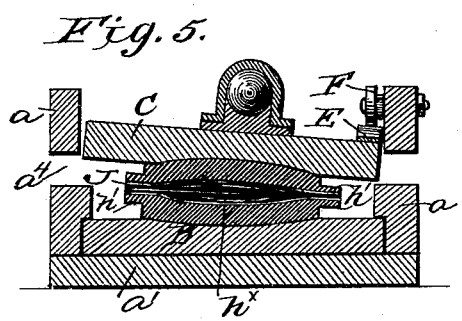

Figure 1 is a perspective view of our improved bunching-machine. Fig. 2 is a longitudinal section of the same, showing the slides in their normal position. Fig. 3 is a similar view, showing the slides at their forward position. Fig. 4 is a transverse section on the line 4 4, Fig. 3. Fig. 5 is a similar view on the line 5 5, Fig. 3. Fig. 6 is a detail view of the rolling-apron. Fig. 7 illustrates a plan, and Fig. 7$^a$ a sectional view, of a modification hereinafter referred to, and Figs. 8 and 9 are detail views, hereinafter specifically referred to.

In the accompanying drawings, A indicates the frame of the machine, which consists of the longitudinal side pieces $a\ a$, the base or bed portion $a'$, the forward transverse end pieces $a^2\ a^2$, and the rear cross-piece $a^3$. The bed portion $a'$ extends from the forward or receiving end back about one-half the length of the frame, said portion forming the support for the lower slide B, which is guided between the longitudinal strips $b\ b$, secured to the inner face of the side pieces $a'\ a'$, as most clearly shown in Fig. 2 of the drawings, by reference to which it will be seen the said side pieces $a'\ a'$ are formed with longitudinal slots $a^4$, which form the guides for the rear end of the upper slide C, said rear end being formed of a transverse bar $c$, the ends of which are provided with friction-rollers $c'\ c'$, as shown. The upper slide C consists of a rectangular board, the forward end of which is normally elevated above the rear end of the lower slide B, said forward end being provided with a laterally-projecting guide-finger D, arranged to engage with a suitably-formed guide-recess, which serves to adjust one edge of said end of the slide vertically as it is fed forward in a manner presently described. The opposite edge of the said end of the slide is formed with a plate E, the outer edge of which is slightly inclined downward, as at $e$, while the rear portion is formed with an upward incline $e'$ and a continuous straight portion $e^2$, said plate being arranged to engage with the under face of a fixed guide-roller F, for a purpose hereinafter explained.

A shaft G is journaled transversely in the rear end of the frame A, which shaft is formed with a short crank $g$ and a long crank $g'$, said crank $g$ being connected to the rear end of a pitman H, the forward end of which is connected to the lower follower B, as shown, while the crank $g'$ is connected to the rear end of a pitman I, the forward end of which has a ball-and-socket connection with the front end of the upper follower, as most clearly shown in Fig. 2 of the drawings.

J indicates the wrapping and forming apron, which, when constructed as shown in Figs. 2, 3, 4, and 5, is formed of rubber molded to the shape shown most clearly in Fig. 6, by reference to which it will be seen that it is formed of a solid central portion $h$, having a concaved upper face $h^\times$, while its under face is formed with longitudinal shoulders or offset portions $h'\ h'$. The said apron is secured at one end to the outer end of the lower slide, while its opposite end is secured to the outer end of the upper slide, and near such end it is formed with a series of transverse ribs or projections $h^2$, which may be molded with the body of the apron or be formed of transverse strips secured thereto, as shown in the drawings.

By means of the arrangement of the several parts, as described, it will be seen that the binder-leaf, when placed upon the apron J when the slides are back, as shown in Fig. 2, will be carried by the upper slide over the tobacco-fillings when said fillings are laid in the position shown in said Fig. 2, and as the transverse ribs of the apron eugage the mass of fillings they will serve to roll the same and thus effectually cause the binder to be wrapped around it.

We have found from practical experience that the apron J when used for a while has a tendency to crimp and become slightly puckered, which will serve during the operation to wrap the binder uneven. To overcome this objection and to provide means whereby the slack in said apron can be taken up, we arrange the upper slide to have a slight movement forward before the lower slide moves backward. Thus the upper slide in its first movement will draw the apron J taut. For this purpose the pitman H is formed with an elongated slot H′, through which the crank $g$ of shaft G passes, thus allowing for a partial movement of such crank before it will operate on the pitman H.

Although we prefer to employ a forming-apron formed with the transverse strips, as stated, a smooth-face apron may be used, as shown in Fig. 9, which illustrates the apron J with its smooth side up, said side being also concaved, as shown, and the enlarged edges forming guides, as before stated.

Instead of arranging the upper slide for a limited free movement in advance of the lower slide for the purpose stated, the means shown in Fig. 7 may be employed for taking up the slack in the apron, such means consisting of the bars 10 10, arranged at the outer longitudinal edges of the lower slide, the rear ends thereof being supported on the rollers 20 and guided under rollers 30 30 on the transverse bar $c$ of the upper slide, as shown. When the aforesaid means are employed the apron is reversed, as shown in Fig. 9. About midway of said bars 10 laterally-projecting rollers 40 40 are provided, which project inward and engage the guide-flaps $h'$ of the apron at a point where said apron is bent upon itself, (see Fig. 7ª,) and to the outer ends of said bars 10 are connected (by means of cords which pass over pulleys 20 20) the weights 50 50, which serve to always draw the bars 10 and the rollers 40 40 rearward, thereby effectually taking up the slack in the apron. This means of taking up the slack in the apron is also very effectual when such apron is formed of cloth or other flexible material.

As a cigar is irregular in shape, it is essential that when the slides operate to wrap the binder upon the filler it be wound to the tobacco body, so as to retain its proper cigar shape. To this end we arrange the upper slide for irregular transverse vertical motion during its forward movement. For this purpose the rear portion of the slides is pivotally connected to the transverse bar $c$, (see Figs. 2 and 3,) and its upper portion arranged for a universal motion relative to its pitman. We also provide one of the side pieces $a$ with a cam-recess L, which consists of the rear vertical portion $m$, the lower horizontal portion $m'$, the rear upward-inclined portion $m^2$, the upper horizontal portion $m^3$, the forward vertical portion $m^4$, and the downwardly-inclined portion $m^5$, which connects the sections $m'$ $m^3$. By reference to Fig. 4 it will be seen that the lateral guide-finger engages said cam-recess L, while the guide-plate E engages the under face of the fixed roller F. Now, as the machine is set in operation the upper slide draws the apron J taut and at the same time begins to turn the binder about the filler. The lower slide then begins to go in reverse direction to the upper slide, thus allowing the apron to lap and continue to roll the binder about the filler. At this time the guide-plate E will be drawn under the roller F, and that side of the upper slide will be drawn down, thus slightly compressing the point end of the filler. The slide C then proceeds straight for a short distance, when the guide-finger will engage the inclined portion $m^2$ of the recess L, the inclined portion $e'$ of the plate E at this time coming under the roller F. Now as the slide C proceeds forward the point side will be farther pressed down and held down until the straight part $e^2$ of the plate E passes beyond the roller F. The butt side gradually rises for a short distance and then goes straight forward until the guide-finger comes into the straight recess $m^3$, which occurs at the same time that the plate E passes from under the roller F. The slide C is then forced upward by the expansion of the apron until the guide-finger D reaches the vertical portion $m^4$ of the recess L. The crank $g'$ of the shaft G will then be in position to draw the slide backward until its guide-finger again drops into the part $m$ of the recess L.

From the foregoing description, taken in connection with the drawings, it will be observed that during the operation of wrapping the binder on the filler the upper slide serves to hold said filler to its proper shape. The several parts can also be made of convenient proportions to roll and bind cigarettes, cheroots, and the like. We desire it understood we do not limit ourselves to the exact construction of the several parts, as these may be varied in detail without departing from the broad idea of our invention.

Having thus described our invention, what we claim, and desire to secure by Letters Patent, is—

1. A machine for making cigar-bunches, consisting of a main frame, oppositely-movable slides arranged to operate one over the other, means for rocking the upper slide transversely as it is reciprocated forward over the lower slide, a rolling-apron connected to said slide and arranged to fall upon itself as the slides are operated, and means for moving the slides, substantially as and for the purposes described.

2. A machine for making cigar-bunches, consisting of a main frame, a longitudinally-movable slide B, a double crank-shaft journaled transversely of said slide, a longitudinally-movable slide C, operating over the slide B and in reverse directions thereto, a rolling-apron connected at one end to the outer end of the lower slide, its other end to the upper slide, and connections between said slides and the crank-shaft, whereby the said slides are moved in reverse directions, substantially as and for the purpose described.

3. The combination, with the oppositely-movable slides B and C and means for operating them, of the apron J, attached at its opposite ends to the said slides, formed with longitudinal offsets or flanges $h'$, and a central concaved portion, whereby a looped portion is formed in said apron, the bars 10, longitudinally movable on the main frame, said bars formed with lateral projections 40 40, adapted to project over and guided by the flanges $h'$ and seat in the looped portion of the apron, and counter-weights attached to the rear ends of said bars 10, as and for the purposes described.

4. In a cigar-bunching machine, the combination, with the main frame and the transverse crank-shaft G, formed with a short crank $g$, and a long crank $g'$, extended in opposite directions, of the longitudinally-movable slides B C, mounted to slide in said main frame, and a pitman connection between the lower slide and the short crank $g$, a pitman connection between the upper slide and the long crank, and the wrapping-apron J, connected at its opposite ends to the said slides, all arranged as shown, whereby the upper slide will travel faster than the lower slide, substantially as and for the purpose described.

5. In a cigar-bunching machine, the combination, with the main frame, the slides B and C, longitudinally movable therein, and the wrapping-apron J, secured thereto, as shown, of the transverse crank-shaft G, formed with the cranks $g\ g'$, the pitman I, connecting the upper slide and the crank $g'$, the pitman H, connected to the lower slide at one end, its opposite end formed with an elongated slot through which the crank $g$ passes, whereby as the machine is operated the upper slide will have a partial movement forward in advance of the movement of the lower slide, substantially as and for the purpose described.

6. The combination, with the main frame, the longitudinally-movable lower and upper slides B and C, and the apron J, connected to said slides, as shown, of guides formed in the main frame adapted to be engaged by the upper slide, said guides arranged to press said upper slide in a downward direction as it is moved longitudinally forward, and means for operating the slides, substantially as and for the purposes described.

7. The combination, with the main frame and the lower slide B held therein, the fixed roller F, secured to the inner face of one side of said frame, and a cam-recess L, consisting of the vertical portions $m\ m^4$, the straight portions $m'\ m^3$, and the inclined portions $m^2$ and $m^5$, said recess formed in the side of said frame opposite the roller F, of the upper slide C, the apron J, connected at its ends to the lower and upper slides, said upper slide having a cross-bar $c$, guided in the main frame, a body portion pivotally connected to said cross-bar, the guide-plate E, formed with an incline $e^2$ on the front end of the upper slide arranged to engage the roller F, the lateral finger D, arranged to engage the cam-recess L, and means for operating the slide C, substantially as and for the purpose stated.

8. The combination, with main frame having longitudinal guide-slots $a^4$, the lower slide B held to reciprocate in said frame, a fixed projection F on one of the side walls of the frame, and a cam-recess L on the opposite side wall formed of the vertical portions $m\ m^4$, the inclined portions $m^3\ m^5$, and the horizontal portion $m'$, as shown, of the upper slide C, a transverse centrally-pivoted bar $c$ upon its rear end arranged to travel in the guide-slots $a^4$, the apron J, connected at one end to the lower and at its opposite end to the upper slide, a laterally-projecting finger D on the forward end of slide C, arranged to engage the cam-recess L, a guide-plate E on said front end of the slide C, having an incline $e'$ and a straight portion $e^2$ arranged to engage the under face of the fixed projection F, a crank-shaft, pitman connections between said shaft and the slides, whereby said slides are reciprocated, and a jointed connection between said connections and the upper slide, whereby said upper slide is adapted for transverse vertical motion as it moves longitudinally forward, substantially as and for the purpose described.

THOMAS HANCOCK.
LEE B. HANCOCK.

Witnesses:
H. M. SMITH, Jr.,
JAMES C. LAMB.